(No Model.)  2 Sheets—Sheet 1.

M. B. LLOYD.
AUTOMATIC GRAIN SCALE.

No. 493,275.  Patented Mar. 14, 1893.

Witnesses:
J. Jessen
Chas. E. Van Doren

Inventor:
Marshall B. Lloyd.
By Paul & Merwin
Attorneys.

(No Model.) 2 Sheets—Sheet 2.

M. B. LLOYD.
AUTOMATIC GRAIN SCALE.

No. 493,275. Patented Mar. 14, 1893.

Witnesses.
J. Jessen.
Chas. E. Van Doren.

Inventor.
Marshall B. Lloyd.
By Paul & Merwin
Attorneys.

UNITED STATES PATENT OFFICE.

MARSHALL B. LLOYD, OF MINNEAPOLIS, MINNESOTA, ASSIGNOR OF ONE-HALF TO EDWARD H. HOLBROOK, JR., OF SAME PLACE.

AUTOMATIC GRAIN-SCALE.

SPECIFICATION forming part of Letters Patent No. 493,275, dated March 14, 1893.

Application filed July 21, 1890. Renewed August 15, 1892. Serial No. 443,102. (No model.)

*To all whom it may concern:*

Be it known that I, MARSHALL B. LLOYD, of Minneapolis, in the county of Hennepin and State of Minnesota, have invented certain Improvements in Automatic Weighing-Scales, of which the following is a specification.

My invention relates to automatic scales adapted for weighing wheat, corn, malt, fine coal or ore and other like materials and its object is to provide a scale which will be substantially free from any friction of parts which would in any way effect the accuracy of the device, and which will at the same time be of simple and economical construction.

My invention consists principally in certain improvements which I have devised upon the automatic grain weighing scales for which patent, No. 430,867 was granted to me on the 24th of June, 1890.

Said improvements consists first, in means whereby the cutting off of the supply of material to the full side of the hopper, into which just enough material has been fed, is more readily and accurately accomplished, than heretofore. Second, in more efficient and practically frictionless means for automatically locking and unlocking the discharge doors at the bottom of the two compartments of the tilting hopper and third, in means for accurately adjusting the tilting point of the hopper or in other words, of regulating the quantity of material which may be loaded into the hopper before the same will tilt.

My invention will be more readily understood by reference to the accompanying drawings in which,—

Figure 1:
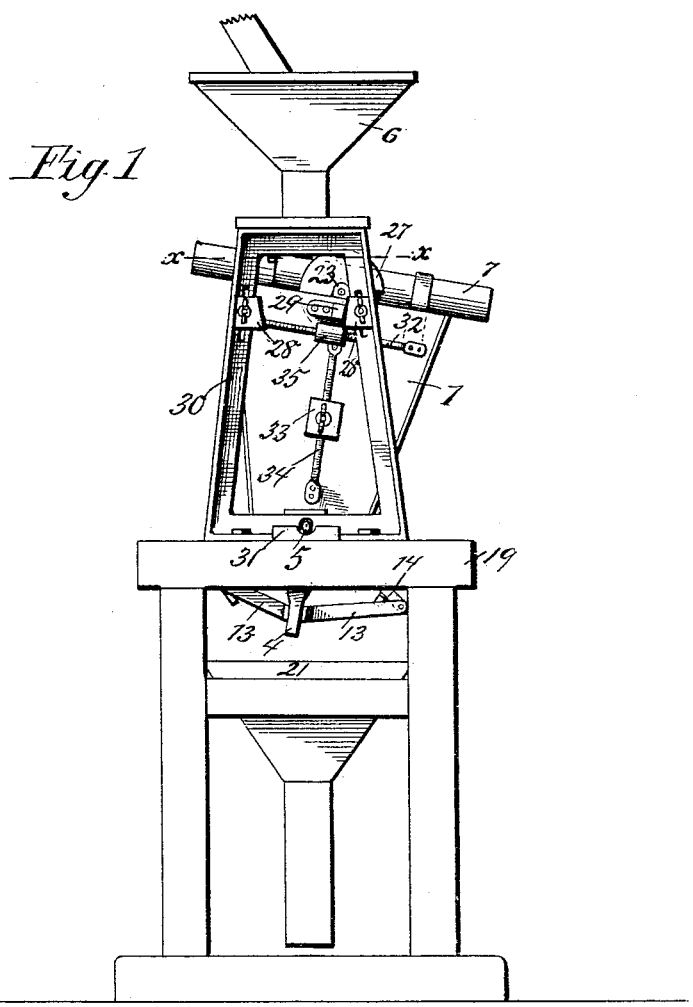
Figure 2:
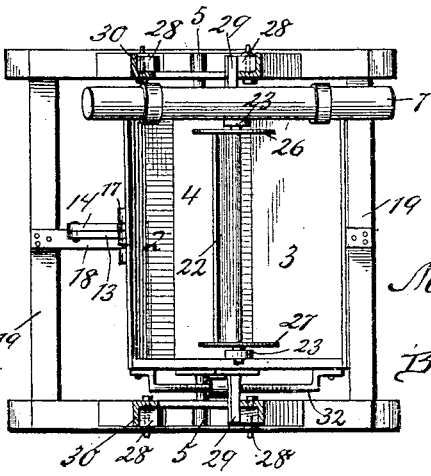
Figure 3:
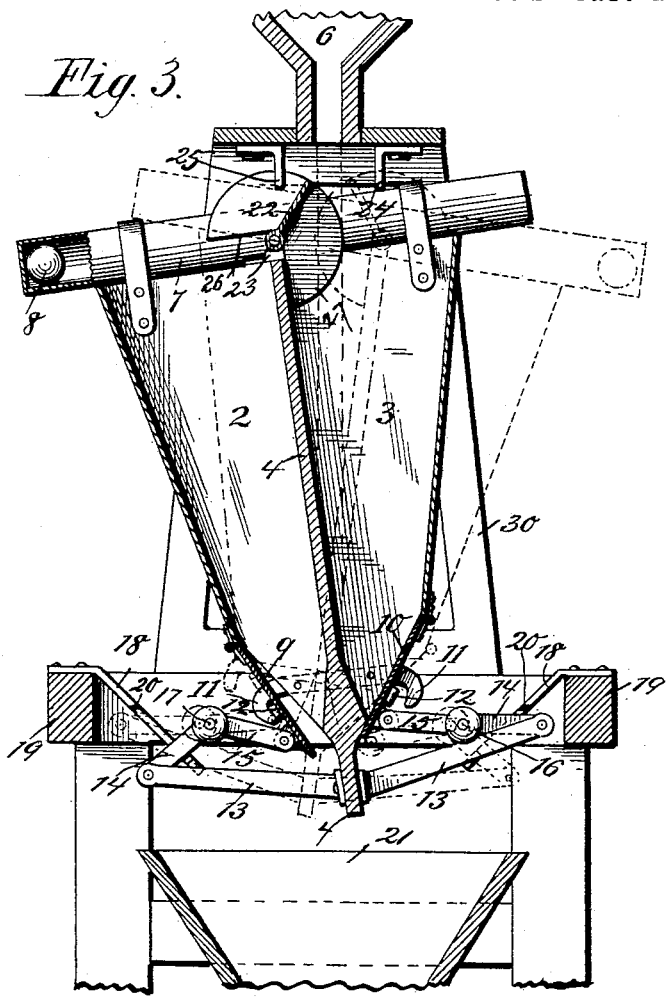
Figure 4:
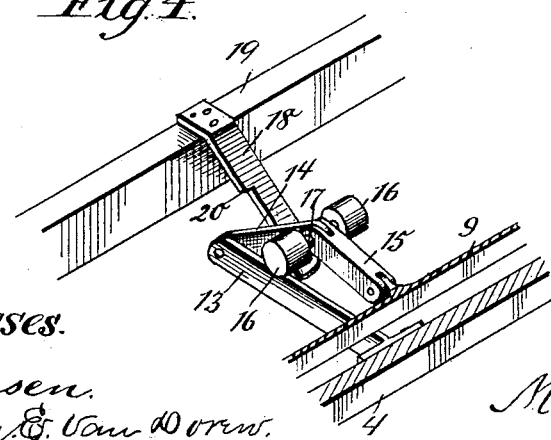
Figure 5:
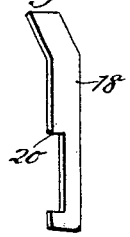

Figure 1 is a side elevation of an automatic weighing scale embodying my invention, the same being shown in connection with a suitable supporting frame and with feed and discharge or receiving hoppers. Fig. 2 is a plan view of the same. Fig. 3 is a vertical section showing the tilting hopper and the door locking devices more in detail. Fig. 4 is a detail perspective view showing the door locking and unlocking device. Fig. 5 is a view of the notched bar forming a part of the locking device shown in Fig. 4 and in Figs. 1 and 3.

Similar reference numerals are used upon like parts throughout the different figures of the drawings.

As shown in Figs. 1, 2 and 3 the tilting hopper 1, of the machine is divided into the two equal sized compartments 2 and 3 by the middle partition 4 and is adapted to tilt to one side or the other upon the knife edge bearing 5 as the different sides or compartments 2 and 3 are alternately filled and emptied. The compartment which is being filled, lies uppermost, while the side from which the grain is being discharged stands in the opposite position. Hence while the material is first fed into the uppermost part of the hopper which lies beneath the feed spout, the center of gravity of the tilting hopper (as shown in Fig. 3) stands upon the left side of the pivot point and the hopper maintains its position. As however the heavy material rises to a higher level in the compartment, the center of gravity passes to the right of the pivot point and the hopper is quickly tilted over to one side by the weight of the material in the same; the other side having meantime been emptied through the open discharge door 9. As the hopper is tilted over, the door on the full side is opened and that on the empty side closed and at the same time the stream of grain which formerly fell into the full compartment is instantly directed into the empty side. Thus the filling of the measuring compartments is alternated one discharging while the other is being filled.

In order that a greater amount of material may be loaded into, and measured off by, the compartments than would be practicable if the weight of the overlying side were alone depended upon, the smoothly bored, closed tube or way 7, containing the weight ball 8 is arranged transversely upon the hopper by means of which, as the ball will always roll to the lower end, the weight to be over-balanced by the fine material in the uppermost compartment, is greatly increased.

The discharge doors 9 and 10, which are hinged by their upper edges to the sides of the hopper, are adapted to close tightly over the openings in the bottoms of the compartments 2 and 3 and are limited in their outward movement by the hooked stops 11, a pair of which are fixed upon each of the tilting hoppers and adapted to engage with the lugs 12 upon the respective doors 9 and 10.

The locking device shown in Figs. 3 and 4 consists in an arm 13 firmly secured to the lower end of the partition 4. Pivoted to the outer end of this bar 13, is the link 14 which, in turn, is pivoted to the second link 15 of the knuckle joint which is movably secured to the discharge door as shown. I preferably provide the weights 16 upon the pivots 17 between the links 14 and 15 to the end that any kicking or rebounding of the knuckle joint from the position which it should assume may be prevented.

The notched bar 18 is rigidly secured to the supporting frame 19 and extends downwardly as shown, the ends or shoulders of the notch being adapted to engage with the link 14 of the knuckle joint when in its extreme positions.

It will be seen that when the tilting hopper is in either of its standing positions that the links 14 of the two locking devices attached to their respective doors 9 and 10 stand free of, and out of engagement with the shoulders, or ends 20 of the bars 18, hence any friction at these points is avoided; the parts of the locking device are so constructed that lateral play is prevented and as the links 14 extend into the notches in the bars 18, only just far enough to engage with the ends or shoulders there will be no engagement with the edge of the bar to cause any friction.

We will say that the hopper stands in the position shown in Fig. 3, and that the grain or other material has been fed into compartment 3 until just the required number of pounds of material have been loaded thereinto. At this time the center of gravity of the whole tilting device will have just passed over the pivot point and the hopper will consequently quickly tilt over into the position shown by the dotted lines. Up to the time that the partition 4 comes into a perpendicular or plumb line no practical change in the relation of the several parts of the device to each other will have taken place, save that the discharge door 9 may naturally close over the discharge opening in the bottom of the side compartment 2. The door will not, however be locked in position until the hopper has so far tilted as to carry the links 14 of the locking device on that side of the hopper up against the upper shoulder 20 of the notch in the bar 18, at which time the movement of the hopper through the last few degrees will bring the link 14 forcibly against said shoulder thereby straightening out the knuckle joint and crowding the pivot 17 thereof down below the dead center line and thereby closing the door 9 firmly over the outlet opening of compartment 2 and locking the door firmly in position. The links 14 will be left standing some distance below the upper shoulder 20 and wholly out of engagement with the bar 18. At the same time that the link 12 spoken of strikes the upper shoulder 20 and while the hopper is being carried over by its own inertia, the opposite link 14 attached to the other door is brought forcibly down against the lower shoulder of the other notched bar 18 thereby throwing the knuckle joint of which it forms a part, up past the dead center and into the bent position shown by the dotted lines, thereby unlocking the door 10 and allowing the same to be swung out by the weight of the material above the same. The link 14 after striking said lower shoulder is moved up and left standing out of engagement with said shoulder. The material in the compartment 3 will now run out into the receiving hopper 21 while the material from the spout of the feed hopper 6 will fall directly into the compartment 2. At the time when the hopper first tilted the deflecting plate 22 pivoted as shown in suitable bearings 23 upon the sides of said hopper, was carried quickly into and across the stream of falling grain, thereby almost instantly deflecting the same into the compartment 2, the door of which was just the instant before closed. As the hopper moved farther over, the upper end of this deflecting plate 22 was carried against the lug 24 and as the hopper continued in its forward movement was turned back into the position shown by the dotted lines in readiness to cut off the supply of material to the compartment 2, when a sufficient weight thereof has been fed into the same. Upon the return tilt of the hopper the deflecting plate 23 will be turned back to its original position by engaging with lug on stop 25. The swing or radial movement of the deflecting plate 22 is limited in either direction by the sectors 26 and 27 upon either end thereof the lower edges of which are respectively adapted to engage with the partition 4 to hold the deflecting plate in position. The width of the feed spout 6 is governed by the width of the said deflecting plate. The frame 30 to which the lugs 24 and 25 and the blocks 21 forming the bearings for the knife edge are secured also supports the hopper spout 6 and four movable blocks 28 adapted to engage with the lugs 29 secured to the sides of the hopper and adapted to limit thereby the pivotal movement of the same. By raising or lowering the blocks 28 the swing or stroke of the tilting hopper may be increased or decreased. The balance of the tilting hopper may be accurately adjusted by means of the shifting weight 35, adapted to be moved back and forth upon the threaded rod 32 secured transversely upon the side of the hopper.

In order that the tilting point of the hopper may be changeable, I provide the weight 33 movably attached to the graduated bar 34, placed centrally in respect to the balance of the hopper; by simply moving this weight up or down, the quantity of material which may be fed into a compartment before the hopper will tilt may be readily increased or decreased at will.

Having thus described my invention, I claim as new and desire to secure by Letters Patent—

1. The combination in an automatic weighing scale, with a tilting hopper provided with suitable downwardly swinging discharge doors adapted to swing from the outer edge of said hopper, of knuckle joint locking devices, secured upon said tilting hopper and pivoted to said doors and a suitable notched bar secured upon the frame of said hopper, said knuckle joint devices being adapted to engage with said bar to lock one of said doors in position and to unlock the other of said doors alternately, substantially as described.

2. The combination of the tilting hopper adapted to operate in suitable bearings provided upon a suitable frame, with movable stops provided upon said frame, suitable lugs upon the sides of said hopper adapted to engage with said stops to limit the throw of the said hopper and a suitable rod secured vertically and centrally upon said hopper and a suitable adjustable weight adapted to be moved up or down upon the said rod whereby the tilting point of the said hopper may be regulated, substantially as described.

3. The combination with a tilting hopper, of an automatic weighing scale, divided into adjacent compartments by a suitable partition, of a suitable deflecting plate pivoted at its lower edge centrally over said partition, a suitable frame in which said hopper is adapted to tilt, and a suitable feed spout supported above said tilting hopper through which the material is fed into said hopper, stationary lugs lying in the path of the upper edge of said deflecting plate adapted to engage with said upper ends to tilt the same into an angle opposite that at which the hopper is tilted, and means whereby the radial swing of said deflecting plate is limited, substantially as described.

4. The combination with a supporting frame, of the tilting hopper divided into the two compartments by the central partition and provided with openings in the bottom of said compartments, suitable swinging doors pivoted to said hopper, notched bars secured upon said supporting frame, knuckle-joint locking devices secured upon either side of the lower end of said partition and pivoted to said doors, respectively, and adapted to engage with the said notched bars to alternately lock and unlock said doors, stops upon said hopper adapted to engage with suitable lugs upon said doors to limit the outward movements of the same, the deflecting plate hinged centrally over said partition, and provided with the sectors upon its ends, the lower edges of said sectors being adapted to engage with said partition to limit the radial movement of said deflecting plate upon its pivot, lugs upon the said frame adapted to engage with said deflecting plate to tilt the same at an angle opposite to that of the said partition when the said plate is carried into engagement with said lugs by the movement of said tilting hopper and means for regulating the tilting point of the said hopper, substantially as described.

5. The combination in an automatic weighing scale, of the tilting hopper pivoted to tilt upon suitable knife edge bearings upon the stationary frame 30 of the machine, and provided with the central partition 4 and with the doors 9 and 10, suitable stops to limit the outward movement of said doors, brackets or arms 13 projecting laterally from the lower end of said partition 4, the links 14 pivoted to the ends of said arms, the links 15 pivoted respectively to said links 14 by the weighted pivots 17, said links 15 being pivotally attached to said doors 9 and 10 respectively, the supporting frame 19 and the notched bars 18 secured thereon and adapted to engage with the links 14 to open and close said doors alternately, substantially as described.

6. The combination with a divided tilting hopper provided with the compartments 2 and 3 and with the discharge doors 9 and 10, and stops limiting the downward movements of said doors, of locking devices attached to said doors, the deflecting plate 22 pivoted centrally over said hopper and provided with the sectors 26 and 27 adapted to operate as stops to limit the radial movement of said deflecting plate, the lugs adapted to engage the upper edge of the said deflecting plate to tilt the same, the upright bar 34 placed centrally upon said hopper, the adjustable weight 33 thereon, the lugs 29 upon the sides of said hopper, and means for limiting the throw of said hopper, substantially as described.

7. The combination with the tilting hopper, of an automatic weighing scale, of the deflecting plate 22 pivoted centrally over said hopper and provided with limiting stops 26, and the lugs 24 and 25 upon the frame of said tilting hopper, said deflecting plate being adapted to engage with said lugs, substantially as described.

8. The combination with the tilting hopper, of an automatic weighing scale, of the bar 34 placed centrally upon the side of said hopper, the adjustable weight thereon, lugs 29 upon said hopper and the adjustable blocks 28 secured upon the stationary frame of said hopper whereby the tilting point of said hopper may be regulated, substantially as described.

9. The combination in an automatic weighing scale, with a tilting hopper provided with swinging discharged doors adapted to swing from the outer edges of said hopper, of knuckle joint locking devices connected with said doors and arranged to lock and unlock said doors alternately as said hopper is tilted, substantially as described.

10. The combination with the tilting hopper and the stationary inlet spout, of the tilting deflecting plate hinged upon the upper edge of the middle partition of said hopper, said plate adapted to swing freely thereon entirely independent of the movement of any other part of the hopper, and means provided on said spout or other stationary support for tilting said plate after its upper edge has
5 passed beneath said spout, substantially as described.

11. The combination with the tilting hopper of the transverse tube or way arranged upon said hopper, the traveling ball arranged within said tube and the vertically adjustable 10 weight arranged centrally upon said hopper, substantially as described.

In testimony whereof I have hereunto set my hand this 14th day of July, 1890.

MARSHALL B. LLOYD.

In presence of—
 A. C. PAUL,
 A. M. GASKILL.